United States Patent
Keoshkerian et al.

(10) Patent No.: US 10,649,355 B2
(45) Date of Patent: May 12, 2020

(54) METHOD OF MAKING A POLYMER COMPOSITE

(71) Applicant: XEROX CORPORATION, Norwalk, CT (US)

(72) Inventors: Barkev Keoshkerian, Thornhill (CA); Rachel Prestayko, Hamilton (CA); Kimberly D. Nosella, Mississauga (CA); Valerie M. Farrugia, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 78 days.

(21) Appl. No.: 15/215,226

(22) Filed: Jul. 20, 2016

(65) Prior Publication Data
US 2018/0022042 A1 Jan. 25, 2018

(51) Int. Cl.
| | |
|---|---|
| *G03G 9/08* | (2006.01) |
| *C08K 3/04* | (2006.01) |
| *C08J 3/16* | (2006.01) |
| *G03G 9/09* | (2006.01) |
| *D01F 1/10* | (2006.01) |

(Continued)

(52) U.S. Cl.
CPC ......... *G03G 9/0804* (2013.01); *B29C 64/106* (2017.08); *B29C 64/118* (2017.08); *B29C 70/58* (2013.01); *B29C 70/882* (2013.01); *B33Y 10/00* (2014.12); *B33Y 70/00* (2014.12); *C08J 3/16* (2013.01); *C08K 3/041* (2017.05); *D01F 1/10* (2013.01); *G03G 9/0904* (2013.01);

(Continued)

(58) Field of Classification Search
CPC . B29C 67/0062; B29C 70/882; B29C 64/141; C08J 3/16; D01F 1/10; D01F 1/09; G03G 9/0804; G03G 9/0904; B33Y 10/00; B33Y 70/00; B29K 2007/00; B29K 2507/04; C08K 3/041
See application file for complete search history.

(56) References Cited

U.S. PATENT DOCUMENTS

| | | | |
|---|---|---|---|
| 3,590,000 A | 6/1971 | Palermiti et al. | |
| 3,655,374 A | 4/1972 | Palermiti et al. | |

(Continued)

FOREIGN PATENT DOCUMENTS

| | | |
|---|---|---|
| CN | 102513098 A * | 6/2012 |
| JP | 2014188871 A | 10/2014 |

(Continued)

OTHER PUBLICATIONS

Tung, "Melt Viscosity of Polyethylene at Zero Shear" Journal of Polymer Science vol. XLVI, (Year: 1960).*

(Continued)

*Primary Examiner* — Michael M. Robinson
(74) *Attorney, Agent, or Firm* — MH2 Technology Law Group LLP

(57) ABSTRACT

A method of making a composite feed material for fused deposition modeling (FDM) is disclosed. The method comprises providing composite particles made by a process of emulsion aggregation, the composite particles comprising at least one thermoplastic polymer and at least one carbon particle material. A composite feed material is formed for fused deposition modeling from the composite particles. The composite feed material is in a form selected from a filament and a paste.

18 Claims, 2 Drawing Sheets

(51) Int. Cl.

| | |
|---|---|
| B29C 70/58 | (2006.01) |
| B33Y 10/00 | (2015.01) |
| B33Y 70/00 | (2020.01) |
| D01F 1/09 | (2006.01) |
| B29K 7/00 | (2006.01) |
| B29K 507/04 | (2006.01) |
| B29C 70/88 | (2006.01) |
| B29C 64/106 | (2017.01) |
| B29C 64/118 | (2017.01) |

(52) U.S. Cl.
CPC ...... B29K 2007/00 (2013.01); B29K 2507/04 (2013.01); D01F 1/09 (2013.01)

(56) References Cited

U.S. PATENT DOCUMENTS

| | | |
|---|---|---|
| 3,720,617 A | 3/1973 | Chatterji et al. |
| 3,983,045 A | 9/1976 | Jugle et al. |
| 4,265,660 A | 5/1981 | Giflo |
| 4,935,326 A | 6/1990 | Creatura et al. |
| 4,937,166 A | 6/1990 | Creatura et al. |
| 5,278,020 A | 1/1994 | Grushkin et al. |
| 5,290,654 A | 3/1994 | Sacripante et al. |
| 5,308,734 A | 5/1994 | Sacripante et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,364,729 A | 11/1994 | Kmiecik-Lawrynowicz et al. |
| 5,366,841 A | 11/1994 | Patel et al. |
| 5,370,963 A | 12/1994 | Patel et al. |
| 5,403,693 A | 4/1995 | Patel et al. |
| 5,405,728 A | 4/1995 | Hopper et al. |
| 5,418,108 A | 5/1995 | Kmiecik-Lawrynowicz et al. |
| 5,496,676 A | 3/1996 | Croucher et al. |
| 5,501,935 A | 3/1996 | Patel et al. |
| 5,527,658 A | 6/1996 | Hopper et al. |
| 5,585,215 A | 12/1996 | Ong et al. |
| 5,593,807 A | 1/1997 | Sacripante et al. |
| 5,650,255 A | 7/1997 | Ng et al. |
| 5,650,256 A | 7/1997 | Veregin et al. |
| 5,686,218 A | 11/1997 | Liebermann et al. |
| 5,723,253 A | 3/1998 | Higashino et al. |
| 5,744,520 A | 4/1998 | Kmiecik-Lawrynowicz et al. |
| 5,747,215 A | 5/1998 | Ong et al. |
| 5,763,133 A | 6/1998 | Ong et al. |
| 5,766,818 A | 6/1998 | Smith et al. |
| 5,804,349 A | 9/1998 | Ong et al. |
| 5,817,206 A | 10/1998 | McAlea et al. |
| 5,827,633 A | 10/1998 | Ong et al. |
| 5,840,462 A | 11/1998 | Foucher et al. |
| 5,853,944 A | 12/1998 | Foucher et al. |
| 5,863,698 A | 1/1999 | Patel et al. |
| 5,869,215 A | 2/1999 | Ong et al. |
| 5,902,710 A | 5/1999 | Ong et al. |
| 5,910,387 A | 6/1999 | Mychajlowskij et al. |
| 5,916,725 A | 6/1999 | Patel et al. |
| 5,919,595 A | 7/1999 | Mychajlowskij et al. |
| 5,925,488 A | 7/1999 | Patel et al. |
| 5,977,210 A | 11/1999 | Patel et al. |
| 5,994,020 A | 11/1999 | Patel et al. |
| 6,020,101 A | 2/2000 | Sacripante et al. |
| 6,110,411 A | 8/2000 | Clausen et al. |
| 6,120,967 A | 9/2000 | Hopper et al. |
| 6,130,021 A | 10/2000 | Patel et al. |
| 6,628,102 B2 | 9/2003 | Batson |
| 6,664,015 B1 | 12/2003 | Sacripante et al. |
| 6,780,560 B2 | 8/2004 | Farrugia et al. |
| 6,818,723 B2 | 11/2004 | Sacripante |
| 6,826,944 B1 | 12/2004 | Hagel |
| 6,830,860 B2 | 12/2004 | Sacripante et al. |
| 6,849,371 B2 | 2/2005 | Sacripante et al. |
| 7,208,253 B2 | 4/2007 | Mayer et al. |
| 7,329,476 B2 | 2/2008 | Sacripante et al. |
| 7,402,371 B2 | 7/2008 | Sacripante et al. |
| 7,416,827 B2 | 8/2008 | Farrugia et al. |
| 7,425,398 B2 | 9/2008 | Nosella et al. |
| 7,442,740 B2 | 10/2008 | Patel et al. |
| 8,076,048 B2 | 12/2011 | Sacripante |
| 8,187,521 B2 | 5/2012 | Larsson et al. |
| 9,205,604 B2 | 12/2015 | Farmer |
| 9,821,411 B2 | 11/2017 | Buller et al. |
| 2002/0081509 A1 | 6/2002 | Yoshida et al. |
| 2004/0209989 A1 | 10/2004 | Cevolini |
| 2006/0134419 A1 | 6/2006 | Monsheimer et al. |
| 2006/0202395 A1 | 9/2006 | Monsheimer et al. |
| 2006/0269859 A1 | 11/2006 | Skorokhod et al. |
| 2007/0190440 A1 | 8/2007 | Kanamaru et al. |
| 2007/0290410 A1 | 12/2007 | Koo et al. |
| 2008/0107989 A1 | 5/2008 | Sacripante et al. |
| 2008/0236446 A1 | 10/2008 | Zhou et al. |
| 2009/0189125 A1* | 7/2009 | Grigorian ............... H01B 1/06 252/511 |
| 2010/0124713 A1 | 5/2010 | Farrugia et al. |
| 2010/0143668 A1 | 6/2010 | Farmer et al. |
| 2010/0267902 A1 | 10/2010 | Cai et al. |
| 2014/0138589 A1* | 5/2014 | Hayano .................... C08K 3/04 252/511 |
| 2014/0243446 A1* | 8/2014 | Turk .................... G03G 9/0804 523/122 |
| 2017/0028632 A1 | 2/2017 | Cox et al. |
| 2018/0009033 A1 | 1/2018 | Fager |

FOREIGN PATENT DOCUMENTS

| | | |
|---|---|---|
| WO | WO2014144230 A1 | 9/2014 |
| WO | WO2016057250 A1 | 4/2016 |

OTHER PUBLICATIONS

"PCL Applications and End Uses Polythene," Polyesterconverters. com, Retrieved on May 23, 2018. (Year: 2018).*
"Exfoliated graphite nanoplatelets" https://en.wikipedia.org/wiki/Exfoliated_ graphite_ nanoplatelets, last edited on Apr. 28, 2016 (Year: 2016)*
Extended European Search Report dated Dec. 20, 2017 in corresponding European Patent Application No. 17181759.6.
Wei et al., "3D Printable Graphene Composite," Scientific Reports, vol. 5, No. 1, Jul. 8, 2015, pp. 1-7.
Fanselow et al., "Production of Micron-Sized Polymer Particles for Additive Manufacturing by Melt Emulsification," AIP Conference Proceedings, 1713, 140007 (2016).
Extended European Search Report dated Nov. 22, 2017 from related European Applicatiion No. 17181760.4.
Canadian Office Action issued in corresponding Canadian Application No. 2,974,293 dated Sep. 17, 2018 (5 pages).
Canadian Office Action issued in related corresponding Canadian Application No. 2,974,094 dated Sep. 17, 2018 (5 pages).

* cited by examiner

METHOD OF MAKING A POLYMER COMPOSITE

FIELD OF THE DISCLOSURE

The present disclosure is directed to a method of making a polymer composite, such as a polymer composite that can be used as a feed material for fused deposition modeling.

BACKGROUND

Additive manufacturing (also known as three dimensional printing) as practiced in industry has been, to date, mostly concerned with printing structural features. The main materials used are thermoplastics that offer form but not function.

There is great interest in the field of additive manufacturing to develop improved materials that can be used to easily print completely integrated functional objects with limited post-assembly. This would allow completely new designs in the manufacturing and consumption of everyday objects, particularly when they can be enabled with electrically conductive materials. The capability of printing conductive components within an object can provide the potential for embedded sensors and electronics.

Common techniques in additive manufacturing utilize the extrusion of molten polymer through a heated nozzle. This method is used in, for example, fused deposition modeling (FDM), where a filament is fed into a hot zone for continuous extrusion. The molten polymer can be deposited layer by layer onto a build plate in order to form 3D objects.

The functional part of the polymer (e.g. graphitic material for conductivity) must be present in the filament in an FDM process. A subset of FDM is Paste Extrusion (PE), which is used in the case of materials that are not rigid enough to be fed as a filament through the nozzle head. In both cases the composite polymer is typically made during melt processing in an extruder. For FDM, a filament is then produced and for PE the composite is used as is.

There are very few filament materials currently on the market which exhibit electrical conductivity, and those which are available have relatively low conductivities, which limits the range of potential applications. One example of a paper directed to the study of electrical percolation in such materials is Yao Sun et al., Modeling of the Electrical Percolation of Mixed Carbon Fillers in Polymer-Based Composites, Macromolecules 2009, 42, 459-463, which describes the use of multi-walled carbon nanotubes and either carbon black or graphite to lower percolation thresholds for polymer composites. This paper does not describe techniques for increasing conductivity substantially beyond the percolation threshold. Nor does it discuss the use of conductive polymers for additive manufacturing.

Achieving high loadings of conductive materials (e.g., graphitic materials) into a filament composite would enable high conductivity. However, these high loadings for typical additive manufacturing polymers (e.g. polycaprolactone, polyurethanes) would result in melt temperatures of over 250° C. or 300° C., which potentially renders the materials unsuitable for 3D printing because such high temperatures are generally not used in 3D printers. In addition even if one could attain these melt temperatures, polymer degradation would become an issue at such high temperatures.

Filament composites for FDM are often prepared using an extruder. Using an extruder to prepare a composite requires a minimum polymer viscosity for good mixing, dispersion and extrudability. The minimum viscosity may be in the tens of thousands of centipoise, for example. Thus, while lower viscosity polymer materials could be used to decrease melting temperatures of high carbon particle load materials, the minimum viscosity requirements of the extruder precludes the use of such low viscosity or low glass transition temperature (Tg) polymers in extruded FDM feed materials.

The process of emulsion aggregation (EA) is generally well known in some arts, such as for toner manufacturing. In a typical EA process, a latex is first aggregated by the judicious use of an aggregant that destabilizes the latex and allows controlled growth to a desired particle size. It is then stabilized and heated above the glass transition temperature ("Tg") of the polymer to allow for polymer flow and coalescence of the resulting particles to from a larger homogenous polymer particle. In manufacturing toner processes, different materials (pigments, carbon particles such as carbon black, or waxes) are added during the EA process that can be incorporated in the final polymer particle. However graphitic materials such as Carbon Nanotubes (CNT) have not been used in the percentages (>5% by weight) required to enable conductive polymers (with conductivities typically greater than 1 S/cm).

There is therefore a need to have an efficient and inexpensive process for preparing new polymers that are heretofore been excluded from being used in FDM.

SUMMARY

An embodiment of the present disclosure is directed to a method of making a composite feed material for fused deposition modeling (FDM). The method comprises providing composite particles made by a process of emulsion aggregation, the composite particles comprising at least one thermoplastic polymer and at least one carbon particle material. A composite feed material is formed for fused deposition modeling from the composite particles. The composite feed material is in a form selected from a filament and a paste.

Another embodiment of the present disclosure is directed to a method of making composite particles. The method comprises providing a stable emulsion of latex thermoplastic polymer particles. The latex thermoplastic polymer particles are aggregated in the presence of at least one carbon particle material to form aggregate particles comprising both the latex thermoplastic polymer particles and the carbon particle material. The aggregate particles are heated to coalesce the latex polymer particles and form composite particles comprising the coalesced latex polymer and the carbon particle material, the carbon particle material being in an amount of at least 5% by weight, based on the total weight of the composite particles.

The compositions of the present application exhibit one or more of the following advantages: the ability to use polymers with low Tg and/or low viscosities to form materials with improved processability for 3D printing applications, such as use in fused deposition modeling (FDM) filaments and pastes; an unexpected, synergistic increase in electrical conductivity when emulsion aggregation is used to form polymer/conductive particle composites compared to conductivities achieved using melt mixing; or an improved method for increasing the electrical conductivity in polymer composites while retaining material properties suitable for additive manufacturing.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

Figure 1:
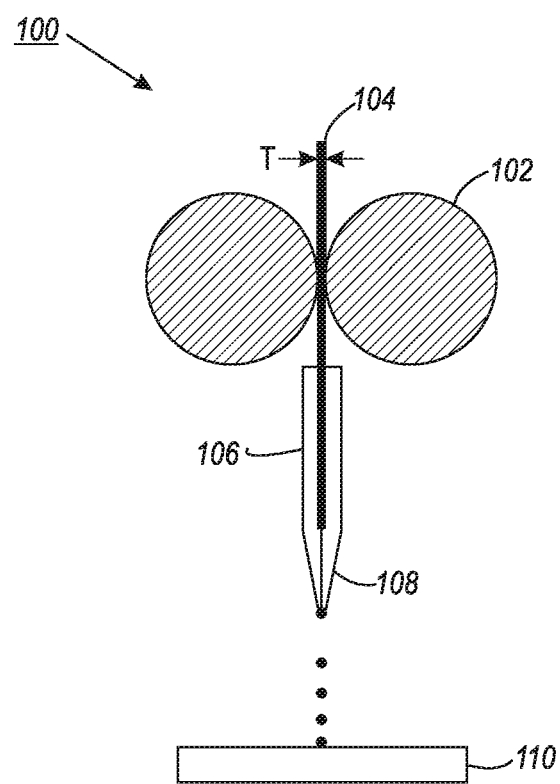
FIG. 1 illustrates a three-dimensional printer employing a filament made with the compositions of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawings that form a part thereof, and in which is shown by way of illustration a specific exemplary embodiment in which the present teachings may be practiced. The following description is, therefore, merely exemplary.

The present disclosure is directed to a method of making a composite feed material for fused deposition modeling (FDM). The method comprises providing composite particles made by a process of emulsion aggregation. The particles comprise at least one thermoplastic polymer and at least one carbon particle material. The method further comprises forming a composite feed material for fused deposition modeling from the particles. The composite feed material is in a form selected from a filament and a paste.

The at least one polymer can be any thermoplastic material useful in three dimensional printing that is capable of forming a latex emulsion where the size of the latex particles can be grown by emulsion aggregation. A single latex polymer or mixtures of thermoplastic latex polymers can be employed, including mixtures of any of the thermoplastic latex polymers disclosed herein. In an embodiment, the thermoplastic latex polymer comprises at least one repeating unit selected from the group consisting of acrylate units, alkyl acrylate units such as butyl acrylate (e.g., n-butyl acrylate), carboxylic acid ester units, amide units, lactic acid units, benzimidazole units, carbonate ester units, ether units, sulfone units, arylketone units, arylether units, etherimide units, ethylene units, phenylene oxide units, propylene units, styrene units, vinyl halide units and carbamate units. In an embodiment, the thermoplastic polymer is a copolymer, such as a block copolymer, of two or more of any of the above listed repeating units. As an example, the thermoplastic polymer latex can comprise at least one polymer selected from the group consisting of polyacrylates, polybenzimidazoles, polycarbonates, polyether sulfones, polyaryl ether ketones such as polyether ether ketone, polyetherimide, polyethylenes such as polyethylene and poly(ethylene-co-vinylacetate), polyphenylene oxides, polypropylenes such as polypropylene and Poly(vinylidene fluoride-co-hexafluoro-propylene), polystyrenes such as polystyrene, poly(styrene isoprene styrene), acrylonitrile butadiene styrene (ABS) and poly(Styrene Ethylene Butylene Styrene) (SEBS), styrene-butyl acrylate such as styrene n-butyl acrylate, polyesters such as polyethylene terephthalate, polylactic acid (PLA) and polycaprolactone, polyurethanes, polyamides such as nylon, Poly(vinylidene fluoride) (PVDF) and polyvinyl chlorides. In an embodiment, the thermoplastic polymer does not include Acrylonitrile butadiene styrene (ABS) or PLA.

In an embodiment, low viscosity and/or low glass transition polymers are employed. It is believed that the use of low viscosity polymers can allow for high CNT loadings, thereby increasing conductivity, while achieving final polymer melt properties for the composite that are sufficiently low to allow use of the composite in 3D printing (e.g., composite melt temperature in the region of about 250° C. or lower, such as from about 60° C. to about 200° C. or from about 100° C. to about 150° C. The low viscosity and/or low Tg polymers are chosen to have viscosities lower than 100,000 cP, such as a viscosity ranging from about 100 cP to about 20,000 cP, or from about 1,000 cP to about 10,000 cP, where viscosity is determined at shear of 6.28 rad/sec using a TA instruments model DHR2 rheometer with 2 parallel (25 mm) plates at a temperature of 100° C. The polymers can also be chosen to have Tg of less than 100° C., such as a Tg ranging from about −50° C. to about 90° C. or from about −20° C. to about 50° C.

Examples of such low viscosity polymers include latex comprising poly n-butylacrylate or copolymers with styrene, such as styrene-butyl acrylate latex. Another example of a low viscosity polymer is polyester latex, such as poly (propoxylated bisphenol A co-fumarate).

The thermoplastic polymer can be included in the composite in any suitable amount that will allow the composite to function in a three dimensional printing process. Examples of suitable amounts include a range of from about 40% to about 95% by weight, such as about 60% to about 95%, or about 80% to about 95% by weight, relative to the total weight of the conductive polymer composite.

Any suitable carbon particle material can be employed in the composites of the present disclosure. The carbon particle material can be selected from graphitic particles, such as graphene particles and graphite particles, carbon nanotubes and mixtures of graphitic particles and carbon nanotubes. The term "graphitic particles" is defined herein to include both graphene particles and graphite particles. Carbon particles that impart conductivity other than graphitic materials can potentially be used, such as, for example, carbon black. In an embodiment, carbon black is not employed as a carbon particle, and may be excluded from the composite materials of the present disclosure.

Any suitable carbon nanotubes can be employed. Examples of suitable carbon nanotubes include single walled carbon nanotubes, multi-walled carbon nanotubes and mixtures thereof. In an embodiment, the carbon nanotubes are multi-walled carbon nanotubes. Commercially available sources of carbon nanotubes include, for example, carbon nanotubes available from CHEAPTUBES™ or NANOCYL™, such as Nanocyl 7000.

The composite can include carbon nanotubes and/or graphitic particles in any suitable amount that will provide the desired conductivity. In an embodiment, the total amount of carbon particles (CNT plus graphitic material) in the composite particles is in an amount of at least 5% by weight, such as 5% to about 70%, or about 10% to about 50%, or about 15% to about 40%, or about 25% to about 40% by weight, based on the total weight of the conductive polymer composite particles. Example amounts of carbon nanotubes include a range of from 1% to about 40% by weight, such as about 2% to about 20% or about 5% to about 15% by weight, relative to the total weight of the conductive polymer composite particles. Larger amounts of carbon nanotubes may reduce processability of the composition by a 3D printer, depending, on among other things, the type of thermoplastic and the printing process employed. Thus, in an embodiment, carbon nanotube concentrations of 20% by weight or less, such as 10% by weight or less, relative to the total weight of the conductive polymer composite particles may be preferred. Example amounts of graphitic particles include a range of from about 1 to about 50% by weight, or about 2% to about 40% by weight, or about 3% to about 40% by weight, or about 5% to about 40% by weight, or about 10% to about 40% by weight, or about 20% to about 35% by weight, relative to the total weight of the conductive polymer composite particles.

The average size of the graphitic particle materials can be any desired size. As an example, the size of the graphitic particle materials can range from about 10 nm to about 10 micron, such as about 15 nm to about 5 microns or about 20 nm to about 1 micron or about 50 nm to about 500 nm or about 50 nm to about 300 nm. For graphite and carbon nanotubes, "size" refers to the smallest dimension of the particle, such as diameter. For graphene, the "size" refers to the smallest dimension other than the thickness, which for graphene may be a single monolayer of carbon.

In an embodiment, the emulsion aggregation process comprises: providing a stable emulsion of latex polymer particles. For example, any of the latex polymers described herein can be employed. The stable latex emulsion can be obtained from a third party supplier, or can be made as part of the overall process. For example, the emulsion of latex polymer particles can be made by providing at least one suitable monomer material; and then preparing the emulsion of latex polymer particles from the monomer material by any suitable polymerization technique. Suitable monomers and techniques for forming latex polymers from the monomers are generally well known in the art.

The latex emulsion is mixed with a plurality of carbon particles, including one or more of carbon nanotubes, graphite particles or graphene particles, as described herein. Optionally, the carbon particles can be pre-mixed with a liquid carrier to form a dispersion prior to mixing with the latex emulsion. Other optional ingredients, such as dispersants or pH modifying agents for stabilizing the carbon particle dispersion can also be included, either as an additive to the carbon particle dispersion prior to mixing with the latex emulsion, or as an optional additive that is added after mixing the latex emulsion and carbon particle dispersion. In an embodiment, the carbon particles can be well mixed with the latex emulsion to provide a uniform dispersion of the carbon particles.

The mixture of the latex emulsion and carbon particles are then aggregated by the judicious use of an aggregant that destabilizes the latex and allows controlled growth to a desired particle size. Because the latex polymer particles are aggregated in the presence of the at least one carbon particle material, aggregate particles comprising both the latex polymer particles and the carbon material are formed. Examples of suitable aggregants for use in the process include cationic surfactants, for example, dialkyl benzenealkyl ammonium chloride, lauryl trimethyl ammonium chloride, alkylbenzyl methyl ammonium chloride, halide salts of quaternized polyoxyethylalkylamines, dodecylbenzyl triethyl ammonium chloride, MIRAPOL™ and ALKAQUAT™ available from Alkaril Chemical Company, SANIZOL™, available from Kao Chemicals, and the like and mixtures thereof. An effective concentration of the cationic surfactant generally employed is, for example, from about 0.01 to about 10 percent by weight and preferably from about 0.1 to about 5 percent by weight of monomers used to prepare the copolymer resin.

After the composite particles reach the desired size through aggregation, the emulsion is then stabilized so as to freeze particle growth. This can be accomplished by any suitable method, such as by adjusting pH (e.g., to greater than 8) to accomplish a charge on the particle surface.

The aggregate particles are then heated above the Tg of the polymer so as to flow the polymer sufficiently to coalesce the latex polymer particles. The resulting composite particles comprise the coalesced latex polymer with the conductive carbon particles material mixed therein. In an embodiment, the carbon particles are uniformly dispersed in the coalesced latex polymer of the composite particles. Examples of suitable temperatures used for coalescing the composite particles can range from about 45° C. to about 95° C., such as about 55° C. to about 75° C.

The composite particles can then optionally be washed and dried using any desired process. Suitable processes for washing and/or drying the particles are well known in the art.

The composite particles can have one or more physical differences from particles made by other methods. For example, the particles can have a relatively smooth, spherical shape compared to particles made by grinding techniques. In an embodiment, composite particles formed by emulsion aggregation processes of the present disclosure are relatively monodisperse (e.g., the particles have a smaller size distribution without filtering) compared to particles made by other methods, such as grinding. Further, one of ordinary skill in the art would be able to determine that the present particles are not made by grinding techniques by visual inspection, such as with a high power microscope.

The composite particles made by the emulsion aggregation processes of the present disclosure can have any desired size. Examples of suitable sizes include an average size of about 500 nm to about 100 microns, or about 1 micron to about 50 microns. In an embodiment, the composite particles have a typical toner size, such as about 5 microns to about 20 microns.

The composite particles of the present disclosure can then be used to form the composite feed material for an extruder. As an example, the particles from the emulsion aggregation process can be fed into the extruder and extruded to form a filament. Such methods of extrusion are well known in the art. Any other suitable method of making the filament from the composite particles can be employed.

The filament can have any suitable shape that will allow the filament to be loaded into a 3D FDM printer and printed. The filament, as initially supplied, can have a continuous length that is much longer than its thickness, T, (shown in FIG. 1) such as a ratio of length to thickness that is greater than 100 to 1, such as greater than 500 to 1 or 1000 to 1 or more, where T is the smallest thickness dimension of the filament (e.g., the diameter if the filament has a circular cross-section). The filament can have any suitable thickness, which may depend on the 3D printer being used. As an example, thicknesses can range from about 0.1 mm to about 10 mm, such as about 0.5 mm to about 5 mm, or about 1 mm to about 3 mm.

Alternatively, the composite particles of the present disclosure can be used to make a paste feed material. In an embodiment, a diluent is added to the composite particles to form the paste. Suitable diluents can be any organic solvent that would dissolve the polymers of the composition. The amount of diluent can be chosen to provide a desired viscosity that is suitable for FDM processing. Example viscosities for the paste can range from about 10 cP to about 10,000 cP, such as about 50 cP to about 5,000 cP or about 100 cP to about 1,000 cP, where viscosity is determined at shear of 6.28 rad/sec using a TA instruments model DHR2 rheometer with 2 parallel (25 mm) plates at a temperature of 100° C. Alternatively, the paste can comprise the composite particles made by emulsion aggregation alone, without a diluent.

In an embodiment, the composite feed material has a conductivity that is greater than 0.01 S/cm. This conductivity can be more than double the conductivity of a second composite of the same polymer and graphitic material having the same polymer:graphitic material weight ratio, where the second composite is made by melt mixing in a HAAKE mixer.

The present disclosure is also directed to a method of making composite particles by emulsion aggregation, as described herein. The method comprises providing a stable emulsion of latex polymer particles. The latex polymer particles are aggregated in the presence of at least one graphitic material to form aggregate particles comprising both the latex polymer particles and the conductive material. The aggregate particles are then heated to coalesce the latex polymer particles and form composite particles comprising the coalesced latex polymer and the graphitic material, where the graphitic material is in an amount of at least 5% by weight, based on the total weight of the composite particles.

The present disclosure is also directed to a composite feed material for fused deposition modeling (FDM). The composite feed material is made by any of the methods describe herein. For example, the composite feed material is made by a method comprising: 1) providing composite particles made by a process of emulsion aggregation, the particles comprising at least one polymer and at least one carbon particle material; and 2) making a composite feed material for fused deposition modeling from the particles, the composite feed material being in a form selected from a filament and a paste.

The conductive feed material of the present disclosure can include any suitable optional ingredients other than latex polymer and carbon particles in any desired amounts. For example, the filaments can optionally include plasticizers; and the pastes can optionally include carrier liquids, plasticizers, dispersants and surfactants. The optional ingredients can generally be added during aggregation or later during the extrusion process. Any optional solvents for the paste can be added during the extrusion step to form filaments.

In an embodiment, the composite feed material is a conductive paste. The paste can be a paste at room temperature or a material that needs to be heated in order to flow like a paste. In an embodiment, the paste comprises at least one carrier liquid. In an embodiment, the carrier liquid may be a solvent capable of dissolving one or more of the paste ingredients. In another embodiment, the carrier liquid acts as a diluent, but is not a solvent. Suitable carrier liquids for the paste include, for example, toluene, pyrrolidones (e.g. N-methylpyrrolidone, 1-cyclohexyl-2-pyrrolidone), N,N-dimethylformamide (DMF), N,N-dimethylacetamide dimethylsulfoxide and hexamethylphosphoramide. The carrier liquid can be included in the paste in any suitable amount, such as, for example, about 0.5% to about 60% weight percent based on the total weight of the wet composite paste. Optional additives that can be included in the paste are, for example, dispersants, surfactants, pigments, dyes, ceramic particles, other solvents in addition to the carrier liquid and other conductive additives.

Ingredients not expressly recited in the present disclosure can optionally be limited and/or excluded from the conductive polymer composites disclosed herein. Thus, the amounts of the thermoplastic polymer and carbon particles, with or without any of the optional ingredients expressly recited herein such as carrier liquids, plasticizers, dispersants and/or surfactants, can add up to 90% to 100% by weight of the total ingredients employed in the conductive feed materials of the present disclosure, such as 95% to 100% by weight, or 98% to 100% by weight, or 99% to 100% by weight, or 100% by weight of the total ingredients.

In an embodiment, the composite can be in the form of a dry composite, such as a dry paste or filament, having less than 5% liquid carrier, such as less than 3%, 2% or 1% liquid carrier by weight relative to the total weight of the dry composite, such as no liquid carrier. The dry composite can be formed using solvent, which is then removed by any suitable method, such as by heating, vacuum and/or other liquid removal techniques. Alternatively, the composite can be made without carrier liquid using neat processing techniques. The dry composite can include any desired optional external additives, such as pigments, ceramic particles (e.g., ceramic nanoparticles), and so forth.

In an embodiment, a dry filament composite has a bulk conductivity greater than 0.01 S/cm, such as greater than 0.012 S/cm. Bulk conductivity is calculated using the formula, $$\sigma = L/(R*A) \tag{1}$$

Where:
σ is bulk electrical conductivity;
L is length of the filament;
R is measured resistance of an extruded filament;
A is the cross-sectional area ($\pi r^2$) of the filament, where r is
the radius of the filament.

The resistance, R, can be measured by forming an extruded filament made from the composite. For measurement purposes the tips of the filament are painted with silver to provide good electrical connections with the testing equipment (e.g., a digital multimeter), but would not necessarily be painted if the filaments were to be used in additive manufacturing. Resistance can then be measured across the length of the filament. The dimensions of the filament and the measured value for R can then be used to calculate bulk conductivity (a) of the composite.

The present disclosure is also directed to a method of three dimensional printing using the composite feed materials made by the processes of the present disclosure. Any type of three dimensional printing can be employed, such as filament printing (e.g., FDM) or paste extrusion. The method includes providing any of the conductive polymer composites of the present disclosure to a three dimensional printer. The composite can be in any suitable form useful in three dimensional printing, such as a filament or paste. The conductive polymer can be heated to a molten state suitable for extrusion. Then the heated conductive polymer is extruded onto a substrate to form a three dimensional object.

An example of a three dimensional printer 100 employing a filament of the present disclosure is shown in FIG. 1. The three dimensional printer 100 includes a feeder mechanism 102 for supplying the filament 104 to a liquifier 106. The liquifier 106 melts the filament 104 and the resulting molten plastic is extruded through a nozzle 108 and deposited on a build platform 110. The feeder mechanism 102 can comprise rollers or any other suitable mechanism capable of supplying the filament 104 from, for example, a spool of filament (not shown). The liquifier 106 can employ any technique for heating the filament, such as heating elements, lasers and so forth. The three dimensional printer 100 as shown in FIG. 1 is exemplary only and any type of three dimensional printer can be employed to deposit the filaments of the present disclosure.

EXAMPLES

Example 1—EA Process for Composite Particles—Pre-Dispersion of Carbon Nanotubes (CNT)

Nanocyl-NC7000 with 14.1 pph Dowfax 2A1: In a 1 L plastic bottle 9.7 g of NANOCYL-NC7000 (carbon nanotubes made by Nanocyl of Sambreville, Belgium) and a magnetic stir bar were added. In a 500 ml beaker, 1.35 g of anionic surfactant (Dowfax 2A1) and 230 g of DI water were mixed and heated on a mixing hotplate to 65° C. Once heated, the DI water and surfactant were added to the 1 L bottle. The 1 L bottle was then placed in a water bath at 65° C. and left mixing overnight.

Example 2—10 wt. % CNT/Toner Preparation Using EA Toner (Polyester Based

In a 2 L glass kettle, 221 g of amorphous polyester emulsion (a bis phenol type polyester), 241 g of pre-dispersion of Example 1 and 330 g DI water were combined using homogenization at 3,000 rpm. The slurry was pH adjusted to 4.5 using 0.3M nitric acid. Then 1.7 g of aluminum sulphate mixed with 21 g DI water was added to the slurry under homogenization at 3000-6000 RPM. The reactor was set to 260 RPM and was heated to 49° C. to aggregate the composite particles. The reactor temperature was further increased to 55° C. When the composite particle size reaches 7-8 microns, freezing of particle growth began with the pH of the slurry being adjusted to 7.8 using a 4% NaOH solution. The reactor RPM was decreased to 200 and the reactor temperature was ramped to 85° C. The pH of the slurry was maintained at 7.8 or greater until 73.5° C. Once at the coalescence temperature, the composite particles were coalesced for 1 hour then quench cooled in 360 g DI ice. The composite particles were then washed with 3 DI water washes using 6:1 parts water to dry toner and freeze-dried.

Example 3—10 wt. % CNT/Toner Preparation Using EA Toner, Styrene/nBA Based

In a 2 L glass kettle fitted with a cooling jacket of isopropyl alcohol ("IPA") and ice, the following ingredients were combined: 150 g of styrene-butyl acrylate latex (75 weight % styrene/25 weight percent butyl acrylate, Mw of ~50,000), 59 g of a styrene-n-butyl acrylate latex (10 weight % styrene/90 weight % n-butyl acrylate, Mw ~200,000), 65 g of the pre-dispersion of Example 1 and 362 g DI water. Once slurry temperature was less than or equal to 3° C.; 1.7 g of aluminum sulphate mixed with 21 g DI water was added to the slurry under homogenization at 3000-4000 RPM. The reactor was set to 200 RPM and was slowly step heated to 10° C. to aggregate the composite particles. The reactor temperature was further increased to 48° C. and monitored using a microscope. The reactor temperature was still further heated to 75° C. where upon looking under the microscope the composite particles had coalesced. The composite particles were then quench cooled in 370 g DI ice. The composite particles were then filtered once and air dried in the fumehood. No rejection of composite particles was observed during the process (e.g., particles continued to grow during aggregation without rejecting smaller particles).

Comparative Example A—Polyester/CNT Prepared in HAAKE Melt Mixer

An amorphous polyester latex emulsion (bis phenol type polyester) (45 g) was added to the HAAKE melt mixer at 90° C. with rpm of 30. Then multi-walled carbon nanotubes (MWCNT) (5 g, Nanocyl NC7000) were added and mixed for 30 min at 90° C. The mixer was then heated to 120° C. to enable the composite to be removed from the HAAKE mixer.

Example 4—Preparation of Filaments for FDM

To a melt flow index apparatus was loaded ~10 g of polymer composite from Example 2. The apparatus and polymer composite was equilibrated for 10 minutes at temperature (see Table 1). Then a 17 kg weight was applied to the polymer composite and a filament was extruded resulting in ~1.75 mm filament of about 1 meter in length. The procedure was repeated for the composites of Example 3 and Comparative Example A. Results are shown in Table 1.

TABLE 1

| Composite Used for Filament extrusion | Example 2 Composite | Example 3 Composite | Comparative Example A |
| --- | --- | --- | --- |
| composite formation | EA | EA | HAAKE |
| equilibration temperature | 120° C. | 110° C. | 90° C. |
| extrusion time | 434 seconds | 825 seconds | 442 seconds |

Example 5—Conductivity Comparison

The prepared filaments of Example 4 were cut into 10 cm segments and then their conductivity was measured using a volt meter.

Figure 2:
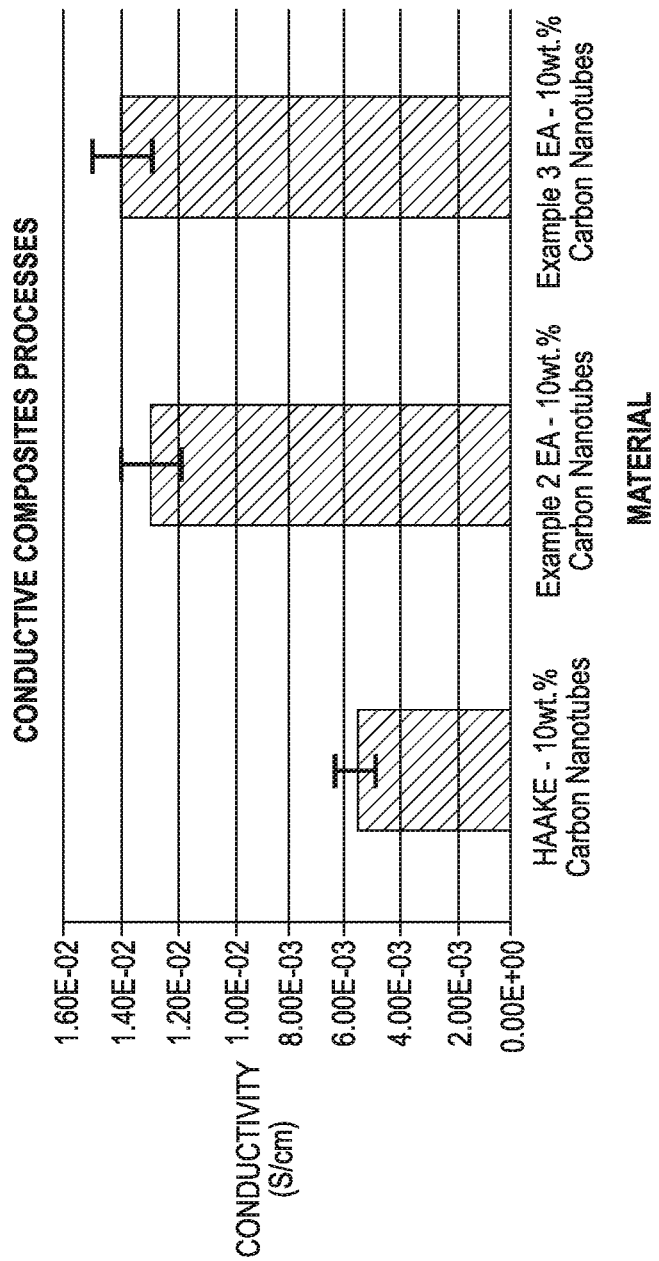
FIG. 2 shows a comparison of the conductivity of a filament made by melt mixing in a HAAKE mixer versus filaments made by an emulsion aggregation process, according to an example of the present disclosure.

Comparing the conductivity of filaments made by melt mixing in the HAAKE versus processing via the EA process showed an unexpected increase in conductivity for the filaments from the EA process, as shown in FIG. 2. The conductivity is about 2 times higher. This may be because of better mixing of the CNT and latex polymer achieved by the EA process. The CNT does not like the water phase and thus naturally is incorporated into the latex particle.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. All concentrations, amounts and ratios herein are disclosed on a by weight basis, unless otherwise made clear by the text of the application.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A method of making a composite feed material for fused deposition modeling (FDM), the method comprising:
   providing composite particles made by a process of emulsion aggregation, the composite particles comprising at least one thermoplastic polymer and at least one carbon particle material; and
   forming a composite feed material for fused deposition modeling from the composite particles, the composite feed material being in a form selected from a filament and a paste,
   wherein the emulsion aggregation process comprises:
      providing the at least one thermoplastic polymer in the form of a stable emulsion of latex polymer particles;
      destabilizing the emulsion and aggregating the latex polymer particles in the presence of the at least one carbon particle materials and an aggregant to form a dispersion of aggregate particles, the aggregate particles comprising both the latex polymer particles and the carbon particle material;
      stabilizing the dispersion to form an emulsion of the aggregate particles, thereby freezing growth of the aggregate particles at a particle size ranging from about 500 nm to about 100 microns; and
      heating the aggregate particles to coalesce the latex polymer particles and form the composite particles.

2. The method of claim 1, wherein the at least one thermoplastic polymer has a Tg of less than 100° C.

3. The method of claim 1, wherein the at least one thermoplastic polymer has a viscosity of less than 50,000 cP, where viscosity is determined at shear of 6.28 rad/sec using a TA instruments model DHR2 rheometer with 2 parallel (25 mm) plates at a temperature of 100° C.

4. The method of claim 1, wherein the at least one thermoplastic polymer is a latex.

5. The method of claim 1, wherein the at least one thermoplastic polymer is selected from the group consisting of polyacrylates, polybenzimidazoles, polycarbonates, polyether sulfones, polyaryl ether ketones, polyetherimide, polyethylenes, polyphenylene oxides, polypropylenes, polystyrenes, styrene-butyl acrylate, polyesters, polyurethanes, polyamides, Poly(vinylidene fluoride) (PVDF), polyvinyl chlorides and combinations thereof.

6. The method of claim 1, wherein the at least one thermoplastic polymer is selected from the group consisting of polyether ether ketone, polyethylene, poly(ethylene-co-vinylacetate), polypropylene, Poly(vinylidene fluoride-co-hexafluoropropylene), polystyrene, poly(styrene isoprene styrene), acrylonitrile butadiene styrene (ABS), poly(Styrene Ethylene Butylene Styrene) (SEBS), styrene n-butyl acrylate, polyethylene terephthalate, polylactic acid (PLA), polycaprolactone, poly (propoxylated bisphenol A co-fumarate), nylon and combinations thereof.

7. The method of claim 1, wherein the at least one carbon particle material is selected from the group consisting of carbon nanotubes, graphite, graphene and combinations thereof.

8. The method of claim 1, wherein providing the stable emulsion of latex polymer particles comprises: providing at least one monomer material;
   and preparing the stable emulsion of latex polymer particles from the monomer material.

9. The method of claim 1, wherein making the composite feed material comprises extruding the composite to form the filament.

10. The method of claim 1, wherein making the composite feed material comprises adding a diluent to the composite particles to form the paste.

11. The method of claim 1, wherein the carbon particle materials are in an amount of at least 5% by weight, based on the total weight of the composite particles.

12. The method of claim 1, wherein the composite feed material has a conductivity that is greater than 0.01 S/cm.

13. A method of making composite particles, the method comprising:
   providing a stable emulsion of latex thermoplastic polymer particles;
   destabilizing the emulsion and aggregating the latex thermoplastic polymer particles in the presence of at least one carbon particle material and an aggregant to form a dispersion of the aggregate particles, the aggregate particles comprising both the latex thermoplastic polymer particles and the carbon particle material;
   stabilizing the dispersion to form an emulsion of the aggregate particles, thereby freezing growth of the aggregate particles at a particle size ranging from about 500 nm to about 100 microns; and
   heating the aggregate particles to coalesce the latex polymer particles and form composite particles comprising the coalesced latex polymer and the carbon particle material, the carbon particle material being in an amount of at least 5% by weight, based on the total weight of the composite particles.

14. The method of claim 13, wherein the latex thermoplastic polymer particles comprise a thermoplastic material.

15. The method of claim 13, wherein the at least one thermoplastic polymer is selected from the group consisting of polyacrylates, polybenzimidazoles, polycarbonates, polyether sulfones, polyaryl ether ketones, polyetherimide, polyethylenes, polyphenylene oxides, polypropylenes, polystyrenes, styrene-butyl acrylate, polyesters, polyurethanes, polyamides, Poly(vinylidene fluoride) (PVDF), polyvinyl chlorides and combinations thereof.

16. The method of claim 13, wherein the at least one thermoplastic polymer is selected from the group consisting of polyether ether ketone, polyethylene, poly(ethylene-co-vinylacetate), polypropylene, Poly(vinylidene fluoride-cohexafluoropropylene), polystyrene, poly(styrene isoprene styrene), acrylonitrile butadiene styrene (ABS), poly(Styrene Ethylene Butylene Styrene) (SEBS), styrene n-butyl acrylate, polyethylene terephthalate, polylactic acid (PLA), polycaprolactone, poly (propoxylated bisphenol A co-fumarate), nylon and combinations thereof.

17. The method of claim 13, wherein the at least one carbon particle material is selected from the group consisting of carbon nanotubes, graphite, graphene and combinations thereof.

18. The method of claim 13, wherein providing the stable emulsion of latex polymer particles comprises:
   providing at least one monomer material; and
   preparing the stable emulsion of latex polymer particles from the monomer material.

* * * * *